May 28, 1935.  R. REMY  2,003,091
METHOD OF AND DEVICE FOR CLOSING UP VESSELS, ESPECIALLY BOTTLES
Filed May 28, 1931  5 Sheets-Sheet 1
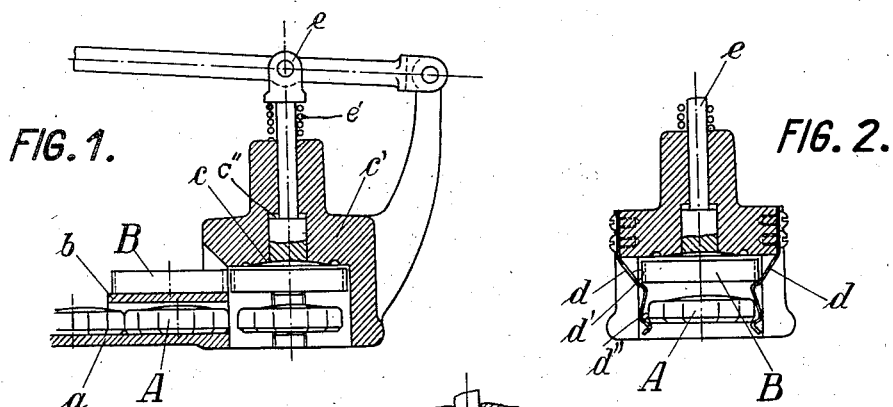
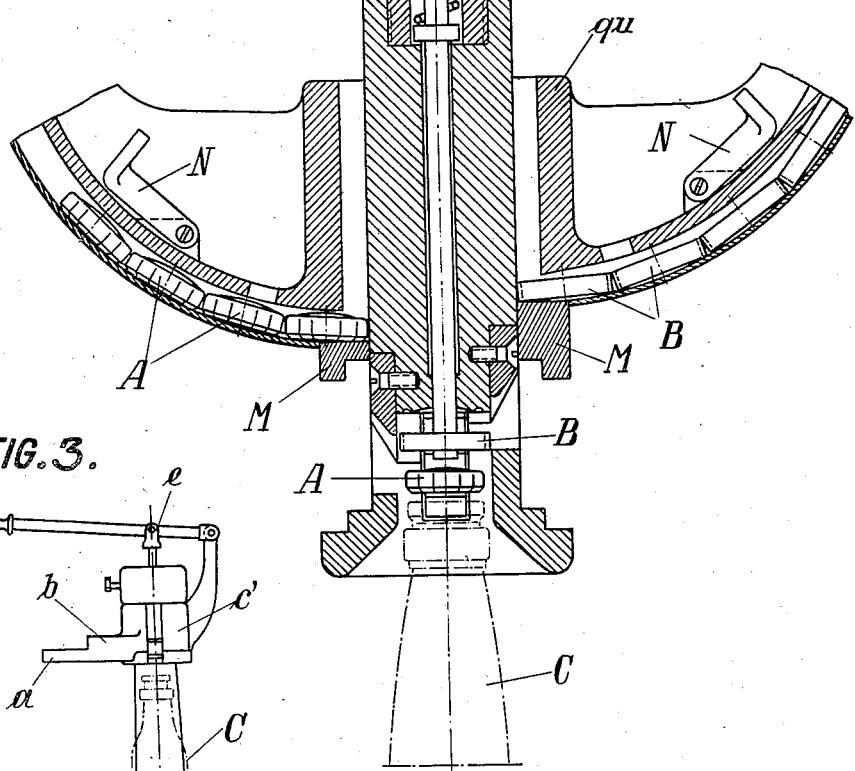
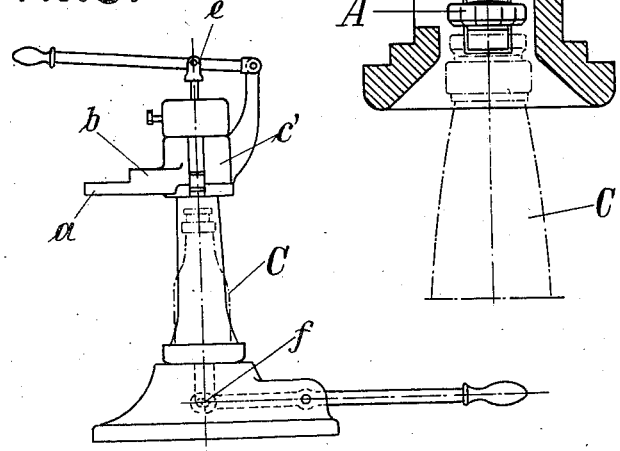
R. Remy
INVENTOR
By: Marks & Clerk
Attys.

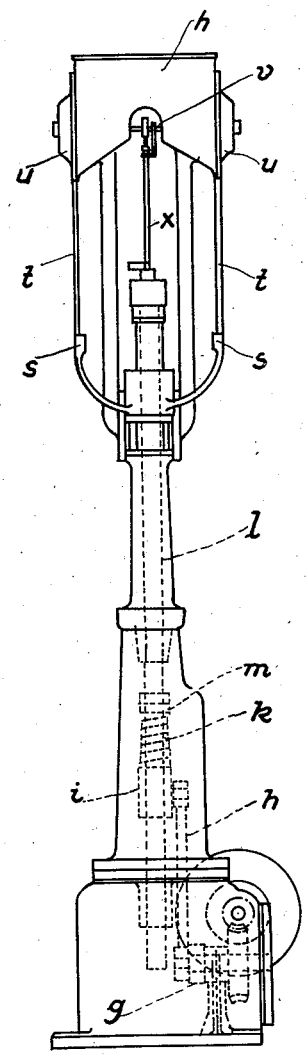
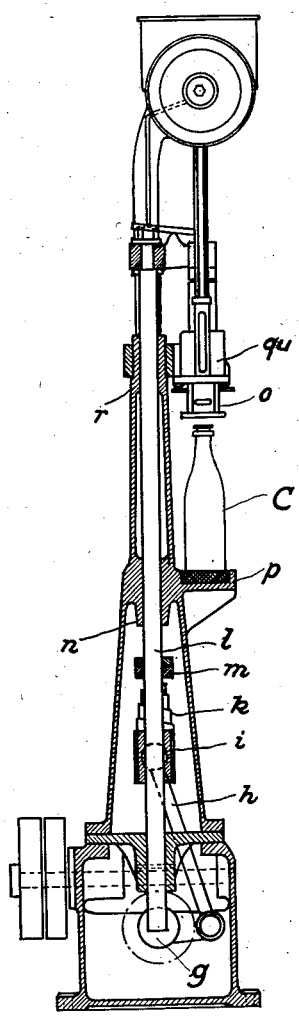

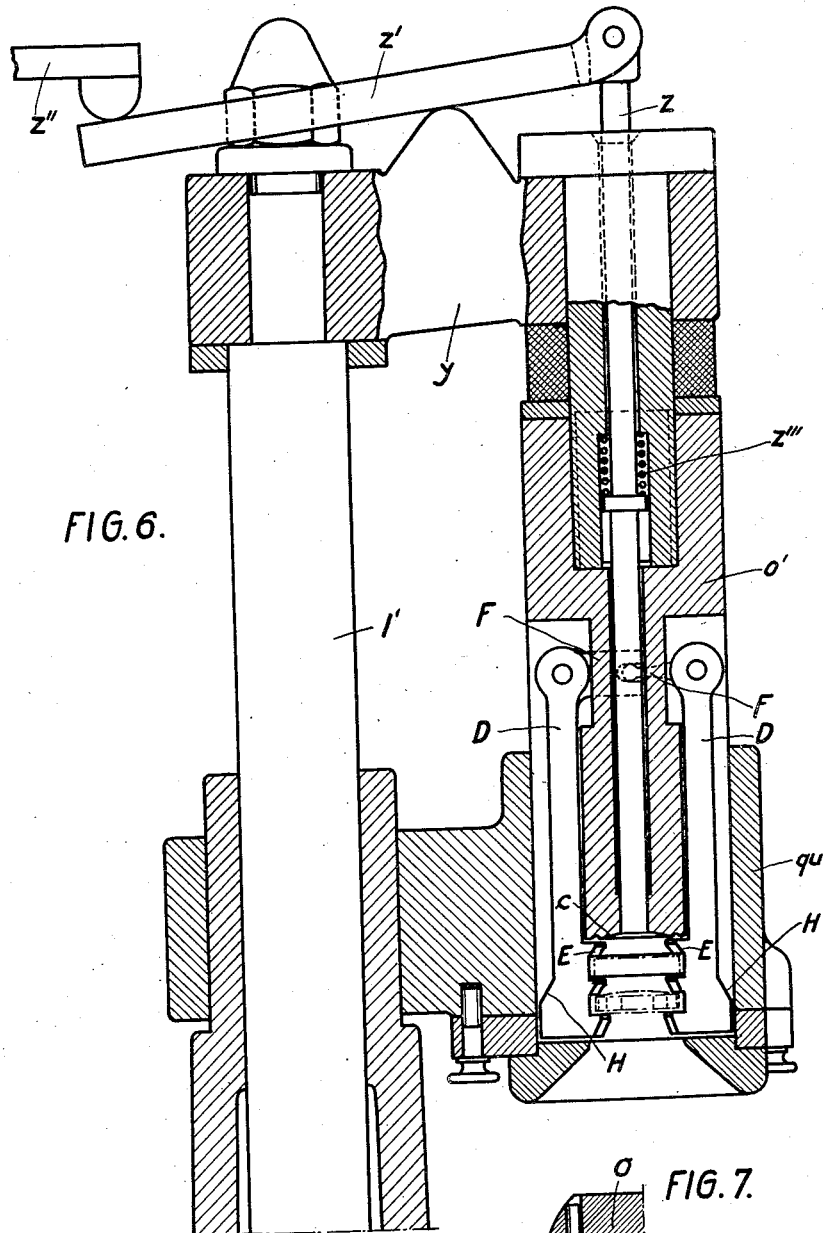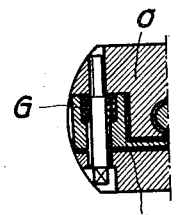

May 28, 1935. R. REMY 2,003,091

METHOD OF AND DEVICE FOR CLOSING UP VESSELS, ESPECIALLY BOTTLES

Filed May 23, 1931   5 Sheets-Sheet 5

Inventor:
R. Remy
By Marks & Clerk
Attys.

Patented May 28, 1935

2,003,091

UNITED STATES PATENT OFFICE 2,003,091

METHOD OF AND DEVICE FOR CLOSING UP VESSELS, ESPECIALLY BOTTLES

Rudolf Remy, Munich, Germany, assignor to Willy Faltlhauser, Munich, Germany

Application May 28, 1931, Serial No. 540,749
In Germany June 2, 1930

22 Claims. (Cl. 226—81)

My invention relates to apparatus for applying closures to receptacles, and particularly to apparatus for affixing to bottles or other receptacles pre-formed closures or caps of the type adapted to be expanded or opened and contracted or closed in applying and removing the same from a receptacle. My invention further relates to means for applying a cap and a retaining ring therefor to a receptacle in a single operation. While my invention may be employed for applying various types of closures and retaining rings to receptacles, it is particularly adapted for use in applying caps or closures and retaining rings such as those described in the co-pending application of Wilhelm Mauser, Serial No. 480,234, filed September 6, 1930.

Heretofore, it has been the practice to apply caps and retaining rings of the type referred to above to receptacles, in a series of operations by which the cap is first expanded, then placed on the receptacle, contracted, and the retaining ring applied thereto. This series of operations is ordinarily performed in a plurality of separate steps and in separate machines, each of which is independently operable. The machines or tools employed for this purpose are expensive and considerable power is expended in operating the several machines. Because of the separation of the operations into a plurality of steps and the use of independent machines for each step, there naturally is an increased number of failures and stoppages of the operation due to the fact that an accident may occur in any one of a number of machines whenever a cap or a retaining ring is displaced. Wear, upkeep and replacements which occur in the maintenance of several such machines are also troublesome and expensive.

In accordance with the present invention, disadvantages and difficulties inherent in the prior art are overcome by providing novel apparatus and methods of procedure. In the apparatus embodying my invention the caps and retaining rings are preferably fed into position beneath a plunger or abutment with the retaining ring located above the cap in position to be applied. Thereafter either the receptacle is moved toward an abutment or the plunger is moved toward the receptacle into position to affix the cap to the receptacle. During this movement the cap, which is fed to the apparatus contracted, is preferably caused to expand to facilitate applying the same. By expanding the cap immediately prior to positioning the same on the receptacle, the packing carried by the cap is prevented from falling out of place or being lost and the caps are presented in condition for ready application. I also provide members for holding the cap and retaining ring after they have been affixed to the receptacle. With the apparatus described, these operations are effected in a single step during a single movement of the plunger or receptacle whereby steps heretofore carried out in several operations and by the use of several machines or tools are simplified and improved and the whole procedure carried out in one operation.

It is an object of the present invention to overcome difficulties and disadvantages of the prior art and to provide simple and inexpensive apparatus and methods whereby both the cap and the retaining ring therefor may be applied to a receptacle in a single operation and by means of a single machine.

Another object of the invention is to provide means for expanding the caps immediately prior to the application thereof to the receptacle.

Other objects of the invention are to provide means for positioning the cap and the retaining ring with respect to a plunger or abutment by means of which the same are applied to a receptacle; to provide means for holding and releasing the cap and retaining ring at predetermined stages of the operation, and to provide means for centering these elements with respect to the plunger or abutment so as to avoid dislocation thereof when being applied.

Another object of the invention is to provide drive mechanism for the apparatus designed to be continuously operated, but permitting proper feed of the caps and retaining rings and the proper application thereof to receptacles.

These and other objects and features of my invention will appear from the following description thereof, in which reference is made to the figures of the drawings which illustrate typical embodiments thereof.

In the drawings, Fig. 1 is a longitudinal, sectional view through a portion of a hand operated device showing an abutment and feed channels for the caps and retaining rings.

Fig. 2 is a longitudinal, sectional view taken at right angles to the view shown in Fig. 1.

Fig. 3 is a diagrammatic illustration of a hand operated machine embodying the features of Figs. 1 and 2.

Fig. 4 is a front view of a form of apparatus designed for power operation.

Fig. 5 is a side view partly in section of the apparatus shown in Fig. 4.

Fig. 6 is a vertical, sectional view through the upper portion of the apparatus shown in Figs. 4 and 5, illustrating a plunger and holding members for the cap and retaining ring in their raised or feeding position.

Fig. 7 is a horizontal section taken through the pivot of one of the holding members shown in Fig. 6.

Fig. 10 is similar to Fig. 8, with the plunger as it appears in its lowered or applying position.

Figure 8:
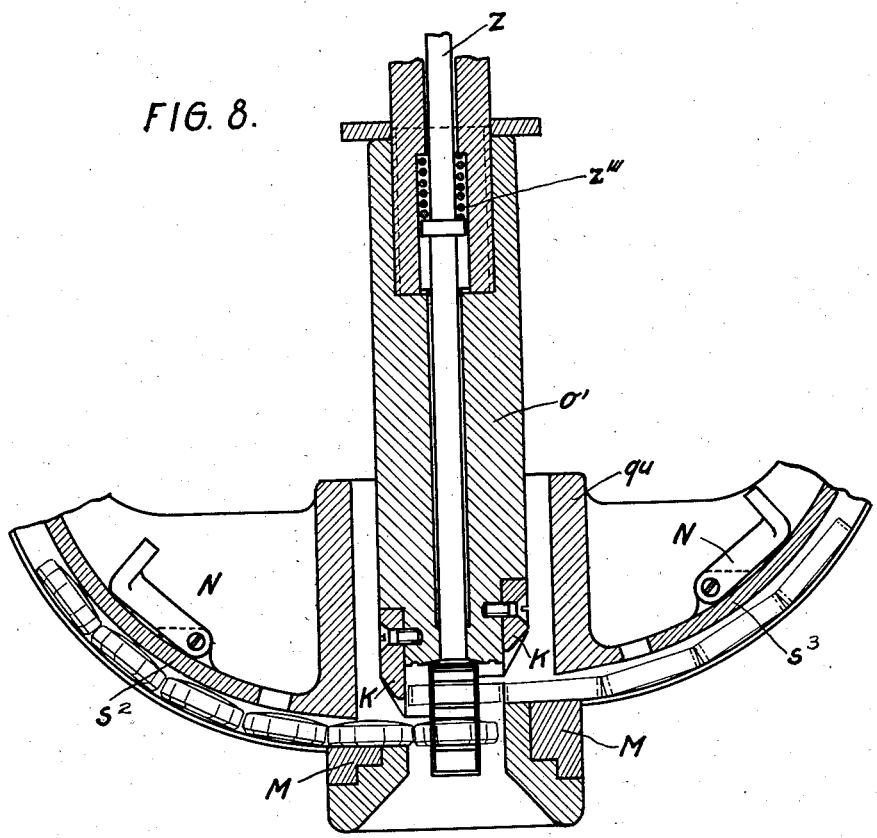
Fig. 8 is a vertical, sectional view taken at right angles to Fig. 6 showing the feed channels for the caps and retaining rings.
Figure 9:
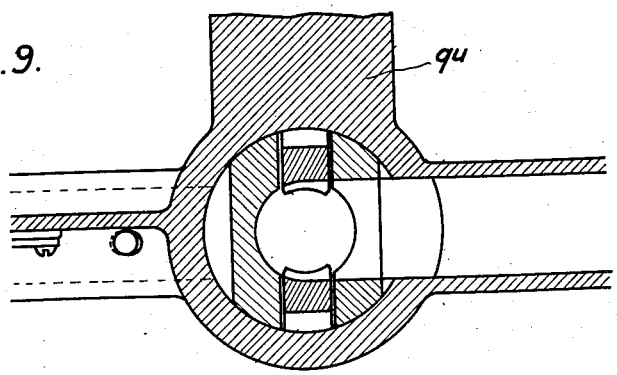
Fig. 9 is a horizontal section of the apparatus shown in Fig. 8 taken through the feed channel for the retaining rings.

The apparatus shown in Figs. 1, 2 and 3 is designed for hand operation and embodies a feed channel $a$ through which the caps A are introduced into position to be applied to a receptacle. A feed channel $b$ through which retaining rings B are passed is located directly above the feed channel $a$ so as to feed a retaining ring into position above the closure and beneath an abutment $c$. The abutment $c$ is provided with a bearing surface $c'$ against which the cap and retaining ring are pressed by the upward movement of the receptacle to which they are to be applied. The abutment is provided with downwardly extending holding members $d$ in the form of spring pressed arms provided with inwardly extending projections $d'$ and $d''$ for holding the retaining ring and the cap respectively in position.

Closures or caps of the type referred to particularly herein are ordinarily provided with a packing member which is loosely inserted in the cap when the cap is expanded. Thereafter the cap is closed to prevent the packing from dropping out during shipping and storage of the caps. In view thereof, it is usually desirable to expand each cap before it is applied to the receptacle, and it is desirable that the expanding of the cap shall take place immediately prior to the application of the cap to the receptacle in order that the packing will not drop out during the movement of the plunger or receptacle into position to apply the cap. Although in some instances it is possible to apply the cap to a receptacle without previously expanding the cap, this procedure may deform the claws by which the cap is secured in place on the receptacle and therefore I prefer to expand the cap before applying the same. For this purpose the abutment is provided with a centrally located opening member $c''$ adapted to be moved downwardly to engage the top of the cap and expand the same prior to applying it to a receptacle. The upper end of the opening member is pivotally secured at $e$ to an operating lever for actuating the same. A spring $e'$ is positioned between the upper end of the rod $c''$ and the operating lever to maintain the expanding member normally in its raised position to permit the insertion of the caps and retaining rings into engagement with the holding members. It may be desirable at times to feed the caps to the holding members in open position, especially when the packing member is glued or otherwise secured firmly to the under side of the cap or if no packing is used. In such cases, it may be possible to omit the expanding member from the apparatus or to allow the same to remain inoperative. The receptacle, which may be a bottle, to which the cap is to be applied, is positioned beneath the abutment and supported upon a platform adapted to be moved upwardly by means of a lower operating lever connected to the platform through the pivoted connection $f$.

In the operation of the device shown in Figs. 1 to 3, a contracted cap is fed into engagement with the holding members at $d''$ through the feed channel $a$. Similarly, a pre-formed retaining ring B is fed into engagement with the holding members at $d'$ above the cap A through the feed channel $b$. A bottle to which the cap is to be applied is placed on the movable platform beneath the abutment $c$ and is moved upwardly by means of the lower operating lever to bring the top of the bottle into engagement first with the cap. During the upward movement of the bottle the upper lever to which the expanding member $c''$ is secured is moved downwardly to cause said member to engage the center of the cap whereby the cap is sprung open to allow it to seat easily upon the top of the bottle. As the bottle continues to move upwardly, it carries the cap therewith into engagement with the retaining ring which bears against the periphery of the expanded cap, causing the same to close or contract about the top of the bottle, and finally brings the closure and retaining ring forcibly against the bearing surface $c'$ of the abutment $c$. The bearing surface preferably is shaped to conform with the top of the cap when affixed to the bottle and is formed with a concave surface to permit the top of the cap to be bowed upwardly while the edges of the abutment bear forcibly against the edge of the cap and the retaining ring. The upper lever may be slightly raised to permit ready closing of the cap if desired, although the action of the retaining ring in being forced down about the cap will insure closing thereof. After the cap and retaining ring have been properly seated and affixed to the bottle, the lower lever is released and the upper lever further depressed to force the bottle with the cap and retaining ring firmly seated thereon, downwardly out of engagement with the holding members $d$. The bottle is then moved from the platform and another placed thereon. The upper lever is released and raised by the action of the spring $e'$ to permit the introduction of a succeeding cap and retaining ring into engagement with the holding members $d$. The operation is then repeated to seal another receptacle.

The structure above described is simple and inexpensive to construct and operate, and insures the proper application of a cap or closure and a retaining ring to bottles, receptacles and the like. It will be apparent that the caps and retaining rings may be introduced from opposite sides of the abutment, and if preferred, the abutment may be moved toward the receptacle as in the forms of the invention hereafter described.

In the structure illustrated in Figs. 4 and 5, the apparatus is designed for power operation and is provided with a rotatable driving shaft $g$ to which is secured a crank having a link $h$ connected thereto provided with a vertically movable sleeve $i$. The sleeve slides along an operating rod $l$ to which is secured a bushing $m$ by means of which the operating rod is raised for lifting the plunger $o'$. A spring $k$ or other suitable means is provided between the sleeve $i$ and the bushing $m$ to permit continued rotation of the shaft $g$ after the rod $l$ has reached the limit of its upper movement. The bushing $m$ carried by the rod $l$ is adapted to engage an abutment $n$ carried by the frame which determines the upper limit of movement of the operating rod. The operating rod and plunger are freely movable downward by gravity or under the influence of suitable additional weight carried thereby and are limited in their downward movement by engagement of the plunger with the receptacle. This freedom of movement renders it possible to employ the apparatus in applying caps or closures to either tall or short receptacles without adjustment of the apparatus.

This arrangement of the drive mechanism for the operating rod permits the plunger to be raised into position to receive a cape and a retaining ring from the feed mechanism employed, and by reason of the lost motion connection between the drive shaft and the operating rod, sufficient time is allowed to permit the cap and the retaining ring to be positioned beneath the plunger before the plunger begins its downward movement. Furthermore, the free movement of the sleeve $i$ with respect to the rod $l$ permits the operating rod to descend freely until the plunger is brought into engagement with the top of the receptacle. Thereafter, the sleeve $i$ moves freely along the operating rod without exerting any force thereon. Thus the plunger is caused to descend into engagement with the top of a bottle or other receptacle with the same force irrespective of the size or shape of the receptacle. It is apparent, however, that the weight carried by the operating rod and plunger may be varied if desired for use with different receptacles.

The upper portion of the frame $r$ is provided with suitable feed mechanism including the feed channels $s$ connected through the channels $t$ to assorting wheels $u$ positioned adjacent the hoppers $w$ to which the caps or closures and retaining rings are supplied. The assorting wheels may be of any well known type and are driven from a common drive shaft $v$ actuated by the shaft $x$.

In the construction illustrated in Figs. 8 and 10, the plunger $o'$ is movable within a guide $q$—$u$ to which the feed channel $s^2$ for the caps and the channel $s^3$ for the retaining rings are connected on diametrically opposite sides. Supporting pieces M are secured to the guide below the channels $s^2$ and $s^3$ to support the caps and retaining rings being fed into position beneath the plunger and to prevent the caps from tipping over or jamming between the plunger and the guide therefor. The plunger is provided with holding members D pivotally secured thereto and extending downwardly below the lower face of the plunger. These members are provided with supporting shoulders D' upon which the cap and retaining ring rest when fed into position. The holding members are also provided with inclined shoulders E above the space provided for the cap and retaining ring for a purpose hereinafter described. When operating the apparatus at high speed for a large output, the supporting shoulders of the holding members upon which the cap and retaining ring rest are preferably horizontal, although inclined supporting shoulders may of course be used.

In the operation of the plunger, the downward movement of the operating rod $l$, causes the plunger, together with the holding members carrying the cap and the retaining ring, to be moved into position to apply the same to a receptacle. The lower ends of the holding members are provided with inclined faces which upon engagement with the top of the receptacle cause the holding members to be spread outwardly so as to deposit the cap in place upon the top of the bottle or receptacle. As the plunger continues to move downwardly, the cam surface E of the holding member bears against the top of the retaining ring carried thereby, forcing the same downwardly about the cap and spreading the holding members still further apart. Continued movement of the plunger forces the retaining ring well down over the cap and insures the proper seating of both the cap and retaining ring. In order to prevent dislocation, tilting, or misalignment of the retaining ring in applying the same, the upper portion of the holding members adjacent the pivots therefor are preferably provided as shown in Figs. 6 and 7 with interlocking arms or teeth F which engage so as to insure simultaneous and equal movement of both or all of the holding members outwardly and uniform engagement of the inclined shoulders E with the retaining ring in applying the same to the receptacle.

The holding members, if not restrained from dropping back into engagement with the closure and receptacle after the closure has been applied, would strip the retaining ring and cap from the bottle or would raise the bottle with the plunger when the plunger is moved upwardly. In order to prevent this action, I provide suitable means for retaining the holding members in their outspread position when the plunger is raised, and for returning the holding members to their holding position before feeding succeeding caps and retaining rings thereto. In the construction illustrated, a spring G serves to force the holding members into engagement with the adjacent face of the plunger to frictionally retain the holding members in their outspread position. When the plunger is raised, the holding members are moved back into position to receive and hold another cap and another retaining ring by means of the inclined shoulders H which engage the lower face of the members M carried by the guide $q$—$u$. With this arrangement, the cap and retaining ring are moved downwardly with the plunger and any tilting of the retaining rings is overcome by the action of the inclined surfaces E of the holding members in positioning the same upon the receptacle. Upon engaging the top of the bottle, the holding members are moved outwardly to deposit the cap upon the bottle and the retaining ring is forced down about the cap, affixing the same to the bottle. The plunger can then move freely upwardly with the holding members in their outspread position without danger or stripping the cap and retaining ring from the bottle and without danger of raising the bottle therewith. The engagement of the inclined shoulders H of the holding members subsequently returns these members into position to again receive and hold a closure and retaining ring so that the operation may be repeated immediately.

Figure 11:
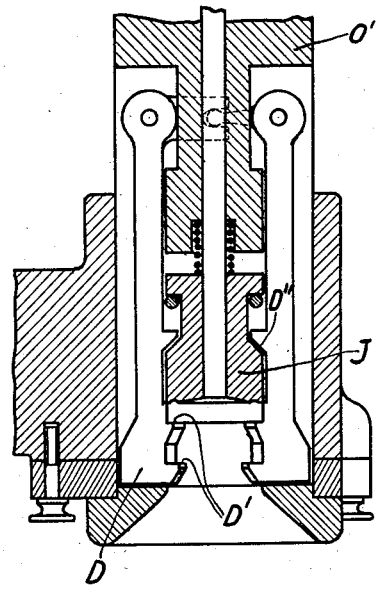
Fig. 11 illustrates a modification of the plunger structure and holding members shown in Fig. 6.

In Fig. 11, I have illustrated an alternative form of plunger provided with a spring pressed member J which upon engagement with the top of the closure is retarded while the plunger continues to descend, thereby contracting the spring and moving the member J upwardly with respect to the plunger. The member J is provided with inclined surfaces D" engaging cooperating inclined surfaces on the holding members D to force the same outwardly so as to release the cap and retaining ring before the plunger is again moved upwardly. The holding members are retracted by engagement with the supports M on the guide $q$—$u$ as in the form of the invention described above, and the member J is returned to its lowered position by the spring as the plunger is raised.

In order to expand the caps prior to applying the same, I have shown in Fig. 6 a longitudinally movable rod Z extending downwardly through the plunger into position to engage the center of the top of the cap to open the same. When the plunger is raised, the rod Z is held upward by means of a fulcrum carried by the connection $y$ between the operating rod $l$ and the plunger. The fulcrum engages a pivoted arm Z' to which the rod Z is secured and the opposite end of the rod Z' is forced downwardly by engagement with the abutment Z" so as to hold the rod Z in raised position. A light spring Z''' is positioned about the rod Z and urges the same downwardly upon the downward movement of the plunger. Thus, as the plunger descends, the rod Z projects below the bearing surface of the plunger and is brought into engagement with the top of the cap as it is applied to the receptacle. In this way the cap is expanded after the plunger begins its downward movement and immediately prior to the application of the cap to the receptacle. The spring Z''' is of such strength that it does not interfere with the subsequent contracting of the cap upon the movement of the retaining ring and the plunger into engagement with the cap.

Figure 13:
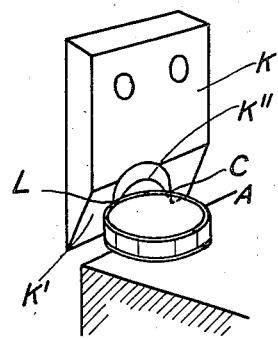
Fig. 13 illustrates one of the cam elements carried by the plunger for preventing caps in the feed channel from interfering with the operation of the plunger.
Figure 14:
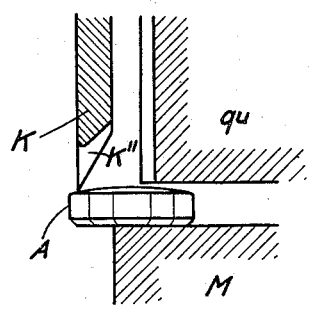
Fig. 14 is a vertical section through the feed channel for the caps.
Figure 12:
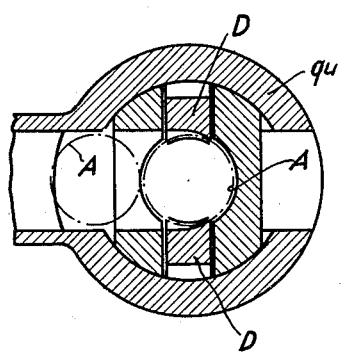
Fig. 12 is a horizontal section taken through the feed channel for the caps shown in Fig. 10.

As shown in Fig. 8, the closures or caps and retaining rings are moved into position beneath the plunger by succeeding closures and retaining rings. It is therefore necessary for the closures and the retaining rings to project inwardly beneath the edge of the plunger, and unless these are subsequently forced back into their respective channels, they will interfere with the downward movement thereof. Furthermore, if the plunger were circular in cross section, the retaining rings and closures would have to be moved backward a considerable distance to permit free movement of the plunger. Therefore I prefer to form the sides of the plunger with flat or cut out portions which permit the closures and retaining rings to project inwardly a considerable distance. The flattened sides of the plunger also serve to prevent rotation of the plunger and insures proper alignment of the parts. It is necessary to retract the closures and retaining rings to some extent, however, and for this purpose I provide cam members K secured to the lower portion of the plunger to move the closures and retaining rings backward away from the plunger as the plunger descends. Since the closures are of smaller diameter than the retaining rings, the plunger moving downward would engage the top of the closure rather than the side thereof, so that an ordinary cam surface such as that used for forcing back the retaining rings would not serve to displace the closures but would engage the top thereof and jam just as though no cam were employed. For this reason. I employ a special form of cam as shown in Fig. 13, in which the leading edge thereof is provided with a cut out portion K" which contacts with the closure at the point L on the side of the closure rather than at the innermost edge thereof. In this way, the downward movement of the cam serves to move the closures backward in the feed channel and away from the plunger to permit free downward movement thereof. As shown in Fig. 8, the closures extend such a distance into the space within the guide that the closures would tip over and jam between the plunger and the guide if not supported, and therefore I provide the supporting members M, which not only serve to support the closures and retaining rings, but are extended completely around the plunger and provide means for returning the holding members to their retracted position, as more fully described above.

The channels $s^2$ and $s^3$ are provided with pivoted lugs N which are adapted to extend through openings in the top of the channels to prevent the closures and retaining rings from being fed into the holding members when it is desired to operate the apparatus for test or repair purposes.

Either the hand operated form of the apparatus shown in Figs. 1, 2 and 3, or the power driven apparatus shown in Figs. 4 to 14 may be used for applying caps alone without retaining rings, or for applying retaining rings to receptacles that are already provided with caps. For example, when only caps are to be applied, the pivoted lug N in the feed channel $s^3$ for the rings is moved into position to prevent the rings from passing into the space provided for the same beneath the plunger. The caps are fed as usual so as to be carried by the holding members during downward movement of the plunger or upward movement of the receptacle. The closure is expanded prior to positioning the same on the receptacle and thereafter is pressed firmly against the top of the receptacle by the plunger. Since the face of the plunger is formed to correspond to that of the contracted cap, the outer edge of the face bears against the outer edge of the cap, holding the cap firmly against the top of the receptacle so as to compress the packing and depress the edges of the cap causing it to contract upon the receptacle while the packing is under compression. The apparatus thus ensures the proper application of the cap and tight sealing of the receptacle irrespective of whether retaining rings are also applied or not.

The application of retaining rings to capped receptacles involves only the feeding of a ring and the positioning of the same on the receptacle by the relative movement of the plunger and receptacle, the operation being similar to that which takes place in applying both the ring and a cap at the same time.

It will be apparent from the foregoing description of typical embodiments of my invention that I have provided simple and inexpensive means and a novel method for applying closures to receptacles, and certain of the features thereof are adapted for use in applying closures alone, without retaining rings when desired, or for applying closures of types other than those referred to specifically herein. The structure is also capable of numerous changes in form and arrangement of the plunger, opening mechanism, holding members or other elements of the apparatus, and in view thereof, I do not intend my invention to be limited to the particular constructions illustrated and described herein except as defined by the claims.

I claim:

1. Apparatus for applying to a receptacle a closure that is adapted to be expanded and contracted in applying and removing the same comprising means for supporting a receptacle, means for supporting a closure in position to be applied to the receptacle, means for bringing the closure and receptacle into engagement to apply the closure to the receptacle, and means movable with respect to the closure to engage the top thereof and expand the same prior to applying the closure to the receptacle.

2. Apparatus for applying to a receptacle a closure that is adapted to be contracted and expanded in applying and removing the same comprising means for supporting a closure above a receptacle, a plunger movable into engagement with the closure to apply the same to a receptacle, and means movable with respect to the receptacle to engage the closure and expand the same prior to applying the closure to a receptacle.

3. Apparatus for applying to a receptacle a closure that is adapted to be contracted and expanded in applying and removing the same comprising means for supporting a closure above a receptacle, a plunger positioned above said closure and movable into engagement with the closure to apply the closure to a receptacle, and means carried by the plunger and movable with respect thereto to engage the closure and expand the same prior to applying the closure to a receptacle.

4. Apparatus for applying to a receptacle a closure that is adapted to be contracted and expanded in applying and removing the same comprising means for supporting a closure in position to be applied to a receptacle, a plunger positioned above said closure and movable downwardly into engagement with said closure to apply the same to a receptacle, and means for expanding said closure prior to applying the same to a receptacle, said plunger having means serving to contract said closure after it has been positioned on the receptacle.

5. Apparatus for applying to a receptacle a closure that is adapted to be contracted and expanded in applying and removing the same comprising a member having means carried thereby for expanding a closure prior to application of the closure to a receptacle, and means for contracting said closure after it has been applied to a receptacle.

6. Apparatus for applying to a receptacle a closure that is adapted to be contracted and expanded in applying and removing the same comprising a plunger, means carried by the plunger for expanding the closure prior to applying the closure to a receptacle and means also carried by the plunger movable into engagement with the closure to contract the same.

7. Apparatus for applying to a receptacle a closure which is adapted to be contracted and expanded in applying and removing the same, comprising a member for supporting a closure, means for supporting a retaining ring for the closure and means acting successively to expand said closure prior to applying the same to a receptacle and to apply said ring to the closure.

8. Apparatus for applying to a receptacle a closure and a retaining ring comprising a plunger, means for moving a closure into position beneath said plunger, means for moving said plunger and closure together into engagement with a receptacle to be sealed, and means carried by said plunger for positioning a retaining ring about said closure after the closure is applied to a receptacle.

9. Apparatus for applying a closure to a receptacle comprising a plunger movable vertically within a guide, holding members pivotally secured to said plunger and extending below the same, feed mechanism registering with the holding members when said plunger is in its raised position to introduce a closure into the holding members, said members being formed with inclined surfaces adjacent the lower ends thereof adapted upon engagement with the receptacle to spread outwardly and deposit the closure on the receptacle, means to retain the holding members in their spread position when the plunger is raised and means on said guide for engaging the holding members to return the same to their closed position to receive and hold another closure member.

10. Apparatus for applying to a receptacle a closure that is adapted to be contracted and expanded in applying and removing the same comprising a plunger, holding members for engaging and holding a closure beneath said plunger and expanding means movable into engagement with the closure while the closure is held by said members to expand the closure prior to affixing the closure to a receptacle.

11. Apparatus for applying to a receptacle a closure that is adapted to be contracted and expanded in applying and removing the same comprising a plunger, expanding means carried by said plunger and holding members for receiving and holding a closure beneath said plunger, said expanding means being movable with respect to said plunger to engage and expand said closure prior to affixing the closure to a receptacle.

12. Apparatus for applying to a receptacle a closure that is adapted to be contracted and expanded in applying and removing the same comprising a vertically movable plunger, an expanding member carried by said plunger, holding members for receiving and holding a closure in position beneath said plunger, feed mechanism adapted to introduce a closure into the holding members when the plunger is in its raised position, a spring urging the expanding member into engagement with the closure to expand the same prior to affixing the closure on a receptacle, and means preventing operation of said expanding means until the plunger is moved downwardly from said raised position.

13. Apparatus for applying to a receptacle a closure and a retaining ring comprising a plunger, feed mechanism for feeding a closure and a retaining ring into position beneath said plunger with the retaining ring above the closure, and means for moving said plunger into engagement with said closure and ring to affix the closure to a receptacle.

14. Apparatus for applying to a receptacle a closure and a retaining ring comprising a plunger, holding members carried by said plunger, and means for feeding to said holding members a closure and a retaining ring in superposed positions with the retaining ring above the closure, and means for moving said plunger into engagement with said closure and retaining ring to affix the same to a receptacle.

15. The method of applying to a receptacle a closure that is adapted to be contracted and expanded in applying and removing the same which comprises moving a closure and retaining ring in spaced relation into position to apply the same to a receptacle, expanding the closure while moving the same into said position, placing the closure on the receptacle and moving the retaining ring into engagement with the expanded closure to contract the same and affix the closure to the receptacle.

16. Device for closing vessels, more particularly bottles, with expansible caps and retaining rings surrounding these caps, comprising a frame for supporting the vessel, means on the frame for successively applying the cap and the ring, holding members adapted to spread apart for holding a finished cap above the vessel to be closed and a finished ring in a concentric position over the cap, and means on the holding members for opening the same by the vessel to be closed for the release of the expansible cap and the retaining ring.

17. Device for closing vessels, more particularly bottles, with expansible caps and retaining rings surrounding these caps, comprising a frame for supporting the vessel, a plunger for applying the expansible cap to the vessel and a further plunger surrounding the aforesaid plunger for applying the retaining ring to the cap already applied to the vessel, and holding members adapted to be spread apart for holding a finished cap over the vessel to be closed and a finished retaining ring in a concentric position over the cap, and means on the holding members for opening the same by the vessel to be closed for the release of the cap and the ring.

18. Device for closing vessels, more particularly bottles, with expansible caps and retaining rings surrounding these caps, comprising a frame for supporting the vessel, a plunger for applying the caps to the vessel and a further plunger surrounding the aforesaid plunger for applying the ring to the cap already applied to the vessel, positively connected holding members adapted to be spread apart for holding a finished cap over the vessel to be closed and a finished ring in a concentric position over the cap, and inclined shoulders on the holding members for opening the same by the vessel to be closed for the release of the cap and the ring.

19. Device for closing vessels, more particularly bottles, with expansible caps and retaining rings surrounding these caps, comprising a frame for supporting the vessel, a plunger for applying the cap to the vessel and a further plunger surrounding the aforesaid plunger for applying the ring to the cap already applied to the vessel, positively connected holding members adapted to be spread apart for holding concentrically a finished cap over the vessel to be closed and a finished ring in a concentric position over the cap, the holding members being arranged on the second-named plunger, inner downwardly inclined and outwardly extending shoulders on the holding members for opening the same by the vessel to be closed for the release of the expansible cap and the retaining ring and an elastic brake device for holding the holding members in the open position.

20. Device for closing vessels, more particularly bottles, with expansible caps and retaining rings surrounding these caps, comprising a frame for supporting the vessel, a plunger for applying the cap to the vessel and a further plunger surrounding the aforesaid plunger for applying the ring to the cap already applied to the bottle, positively connected holding members adapted to be spread apart for holding concentrically a finished cap over the vessel to be closed and a finished ring in a concentric position over the cap, the holding members being arranged on the second-named plunger, inner downwardly inclined and outwardly extending shoulders on the holding members for opening the same by the vessel to be closed for the release of the cap and the ring, an elastic brake device for holding the holding members in the open position, further outer downwardly inclined and outwardly extending shoulders on the holding members for closing the same and a guide for the outer plunger acting on the said outer downwardly inclined and outwardly extending shoulders for closing the holding members.

21. Device for closing vessels, more particularly bottles, with expansible caps and retaining rings surrounding these caps comprising a frame for supporting the vessel, a plunger for applying the cap to the vessel by pressure on the expansible cap at the moment of placing same upon the vessel and a further plunger surrounding the aforesaid ram for applying the retaining ring to the cap already applied to the vessel, positively connected holding members adapted to be spread apart for holding concentrically a finished cap over the vessel to be closed and a finished ring in a concentric position over the cap, the holding members being arranged on the second-named plunger, inner downwardly inclined and outwardly extending shoulders on the holding members for opening the same by the vessel to be closed for the release of the cap and the ring, an elastic brake device for holding the holding members in the open position, further outer downwardly inclined and outwardly extending shoulders on the holding members for closing the same and a guide for the outer plunger acting on the said outer downwardly inclined and outwardly extending shoulders for closing the holding members.

22. Device for closing vessels, more particularly bottles, with expansible caps and retaining rings surrounding these caps, comprising a frame for supporting the vessel, a spring-fitted plunger for applying the cap to the vessel by pressure on the cap at the moment of placing same upon the vessel and a further plunger surrounding the aforesaid plunger for applying the ring to the cap already applied to the vessel, positively connected holding members adapted to be spread apart for holding concentrically a finished cap over the vessel to be closed and a finished ring in a concentric position over the cap, the holding members being arranged on the second named plunger, inner downwardly inclined and outwardly extending shoulders on the holding members for opening the same by the vessel to be closed for the release of the cap and the ring, an elastic brake device for holding the holding members in the open position, further outer downwardly inclined and outwardly extending shoulders on the holding members for closing the same and a guide for the outer plunger acting on the aforesaid outer downwardly inclined and outwardly extending shoulders for closing the holding members.

RUDOLF REMY.